(12) United States Patent
Tochihara et al.

(10) Patent No.: US 10,227,451 B2
(45) Date of Patent: Mar. 12, 2019

(54) METHOD FOR PRODUCING POLYAMIDE

(71) Applicant: Mitsubishi Gas Chemical Company, Inc., Tokyo (JP)

(72) Inventors: Tatsuya Tochihara, Niigata (JP); Katsumi Shinohara, Niigata (JP); Kuniaki Muneyasu, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 15/310,654

(22) PCT Filed: May 8, 2015

(86) PCT No.: PCT/JP2015/063339
§ 371 (c)(1),
(2) Date: Nov. 11, 2016

(87) PCT Pub. No.: WO2015/174345
PCT Pub. Date: Nov. 19, 2015

(65) Prior Publication Data
US 2017/0073469 A1    Mar. 16, 2017

(30) Foreign Application Priority Data
May 13, 2014  (JP) .................. 2014-099771

(51) Int. Cl.
C08G 69/28    (2006.01)
C08K 3/32     (2006.01)

(52) U.S. Cl.
CPC ............ *C08G 69/28* (2013.01); *C08K 3/32* (2013.01); *C08K 2003/329* (2013.01)

(58) Field of Classification Search
CPC ..... C08G 69/28; C08K 3/32; C08K 2003/329
See application file for complete search history.

(56) References Cited

U.S. PATENT DOCUMENTS

| 5,079,307 A | 1/1992 | Taylor et al. |
| 6,136,915 A | 10/2000 | Ohara et al. |
| 2006/0142443 A1 | 6/2006 | Aramaki et al. |
| 2010/0120961 A1* | 5/2010 | Tanaka .................. C08G 69/26 524/414 |
| 2012/0065327 A1 | 3/2012 | Ogawa et al. |
| 2015/0166726 A1 | 6/2015 | Ogawa et al. |

FOREIGN PATENT DOCUMENTS

| CN | 101208390 A | 6/2008 |
| CN | 102449028 A | 5/2012 |
| JP | H03-81325 | 4/1991 |
| JP | H11-222553 | 8/1999 |
| JP | 2004-043812 | 2/2004 |
| JP | 2007-031475 A | 2/2007 |
| JP | 2007-246645 A | 9/2007 |
| JP | 2008-208248 A | 9/2008 |
| JP | 4953669 B2 | 6/2012 |

OTHER PUBLICATIONS

International Search Report dated Jul. 21, 2015 for PCT/JP2015/063339 and English translation of the same (5 pages).

* cited by examiner

*Primary Examiner* — Robert D Harlan
(74) *Attorney, Agent, or Firm* — Fitch, Even, Tabin & Flannery LLP

(57) ABSTRACT

A method for producing a polyamide, comprising performing melt polycondensation of a diamine component comprising xylylenediamine in an amount of 70 mol % or more and a dicarboxylic acid component comprising a linear aliphatic dicarboxylic acid having 6 to 18 carbon atoms in an amount of 70 mol % or more in the presence of a phosphorus atom-containing compound (A), wherein the decomposition temperature of the phosphorus atom-containing compound (A) is not lower than the melting point of the polyamide, and an aqueous solution of the phosphorus atom-containing compound (A) and the diamine component are added to the dicarboxylic acid component being in a molten state to perform the melt polycondensation.

13 Claims, No Drawings

METHOD FOR PRODUCING POLYAMIDE

CROSS-REFERENCE TO RELATED APPLICATIONS

This application is a U.S. national phase application filed under 35 U.S.C. § 371 of International Application PCT/JP2015/063339, filed on May 8, 2015, designating the United States, which claims priority from Japanese Application Number 2014-099771, filed May 13, 2014, which are hereby incorporated herein by reference in their entirety.

FIELD OF THE INVENTION

The present invention relates to a method for producing a polyamide, and specifically to a method for producing a xylylene group-containing polyamide through melt polycondensation of a xylylenediamine component and a linear aliphatic dicarboxylic acid component.

BACKGROUND OF THE INVENTION

When a film is molded by melting a polyamide, the resultant film may contain inhomogeneous fine granular substances mixed therein. The granular substances are called fish eyes and have a melt viscosity (flow characteristic) obviously different from that of ordinary polyamide molecules. Occurrence of fish eyes is considered to be because of gels caused by denaturalization of polyamide such as particular increase of molecular weight or molecular growth of nonlinear chains (ternary polymerization) of polyamide molecules or of foreign substances mixed in polymer. When a polyamide containing gels or foreign substances is used as a molding material for transparent and relatively thin-wall molded articles of bottles, sheets, films or the like, not only the incidence ratio of defectives having a low commercial value in point of the outward appearance thereof owing to the presence of fish eyes increases, therefore resulting in productivity reduction, but also breakage of the molded articles obtained by molding a polyamide containing gels or foreign substances, which originates from the gels or the foreign substances, may be caused when the molded articles receive a shock.

In a polyamide containing a xylylene group such as a metaxylylene group, a paraxylylene group or the like (hereinafter referred to as "xylylene group-containing polyamide"), a radical may readily form at the benzylmethylene group, and therefore as compared with other polyamides such as nylon 6 or the like, the above polyamide has low thermal stability, and when heated in the presence of oxygen, it is readily oxidized to turn yellow. Accordingly, in the production process for a xylylene group-containing polyamide, an antioxidant is generally added to the raw material component for the purpose of preventing oxidative degradation and discoloration of the polyamide (for example, see PTL 1).

As an antioxidant for polyamide, a phosphate-type antioxidant such as a hypophosphite, phosphite or the like is generally used from the viewpoint of the yellowing preventing effect and the cost thereof. The phosphate-type antioxidant is handled as a powder having a mean particle size of 100 μm or so, and in polymerization to obtain polyamide, the antioxidant is, generally as a powder thereof, added to a molten dicarboxylic acid component.

However, it is known that as one reason for gel formation, the above-mentioned phosphate-type antioxidant is involved therein. The phosphate-type antioxidant such as hypophosphite, phosphite or the like absorbs oxygen in a reaction system, and hypophosphite is oxidized into phosphite, or phosphite is oxidized into phosphate. These may often act as a catalyst to accelerate amidation reaction, whereby not only polycondensation reaction is thereby difficult to control but also the above-mentioned particular increase of molecular weight or molecular growth of nonlinear chains of polyamide molecules is induced, therefore resulting in formation of gels.

As a means for preventing the phenomenon, it is known to add an alkali metal salt such as sodium hydroxide, sodium acetate or the like along with a phosphate-type antioxidant. However, excessive addition of an alkali metal salt inhibits amidation reaction to lower proceeding of polycondensation and, as the case may be, heat history in polyamide production may increase to form rather a large amount of gels. Accordingly, it is difficult to completely prevent gel formation by addition of an alkali metal salt.

On the other hand, as a means for removing gels and foreign substances from polyamide, there may be mentioned a technique of making a molten polyamide run through a filter in a molding process. However, gels may be pulverized into fine particles by a fluid pressure to pass through a filter, and it is difficult to completely remove gels. In turn, when the mesh diameter of a filter is reduced for removing finely-pulverized gels, the differential pressure through the filter increases so that the frequency of filter exchange increases and the continuous production time becomes short, therefore bringing about productivity reduction. Consequently, it is desired to prevent gel formation during polymerization rather than removing gels in a molding process.

CITATION LIST

Patent Literature

PTL 1: JP 2007-031475A

SUMMARY OF INVENTION

The problem to be solved by the present invention is to provide a method for producing a xylylene group-containing polyamide having few gels and excellent in mechanical strength, and exhibiting few fish eyes in the molded article thereof.

The present inventors have found that when the dispersibility of a phosphate-type antioxidant in a dicarboxylic acid is poor, gels may often form in the resultant polyamide. In particular, the inventors have found that, among xylylene group-containing polyamides, polyamides using paraxylylenediamine as a starting material have a relatively high melting point, and therefore in producing polyamide, a highly heat-resistant antioxidant must be used, however, many such highly heat-resistant antioxidants do not have a melting point and are therefore difficult to be uniformly dispersed.

The present inventors have further made assiduous investigations and, as a result, have found that, when a phosphorus atom-containing compound in the form of an aqueous solution thereof is added to a molten dicarboxylic acid, the dispersibility of the compound is extremely good in the dicarboxylic acid and gel formation can be therefore prevented therein.

The present invention has been completed on the basis of these findings.

Specifically, the present invention relates to a method for producing a polyamide as described below.

<1> A method for producing a polyamide, comprising performing melt polycondensation of a diamine component comprising xylylenediamine in an amount of 70 mol % or more and a dicarboxylic acid component comprising a linear aliphatic dicarboxylic acid having 6 to 18 carbon atoms in an amount of 70 mol % or more in the presence of a phosphorus atom-containing compound (A), wherein the decomposition temperature of the phosphorus atom-containing compound (A) is not lower than the melting point of the polyamide, and an aqueous solution of the phosphorus atom-containing compound (A) and the diamine component are added to the dicarboxylic acid component being in a molten state to perform the melt polycondensation.

<2> The method for producing a polyamide according to the item <1>, wherein the aqueous solution of the phosphorus atom-containing compound (A) is added to the dicarboxylic acid component being in a molten state so as to disperse the phosphorus atom-containing compound (A) in the dicarboxylic acid component, and then the diamine component is added thereto.

<3> The method for producing a polyamide according to the item <1> or <2>, wherein the diamine component comprises metaxylylenediamine, paraxylylenediamine or a mixture thereof.

<4> The method for producing a polyamide according to any one of the items <1> to <3>, wherein the diamine component comprises paraxylylenediamine in an amount of 70 mol % or more.

<5> The method for producing a polyamide according to any one of the items <1> to <4>, wherein the linear aliphatic dicarboxylic acid is at least one selected from the group consisting of adipic acid, azelaic acid, sebacic acid, undecanoic diacid and dodecanoic diacid.

<6> The method for producing a polyamide according to any one of the items <1> to <5>, wherein the melting point of the polyamide is 260° C. or higher.

<7> The method for producing a polyamide according to any one of the items <1> to <6>, wherein the melting point of the polyamide is 275° C. or higher.

<8> The method for producing a polyamide according to any one of the items <1> to <7>, wherein the phosphorus atom-containing compound (A) is at least one selected from the group consisting of an alkaline earth metal hypophosphite, an alkali metal phosphite, an alkaline earth metal phosphite, an alkali metal phosphate, an alkaline earth metal phosphate, an alkali metal pyrophosphate, an alkaline earth metal pyrophosphate, an alkali metal metaphosphate and an alkaline earth metal metaphosphate.

<9> The method for producing a polyamide according to any one of the items <1> to <8>, wherein the phosphorus atom-containing compound (A) is at least one selected from the group consisting of calcium hypophosphite and magnesium hypophosphite.

<10> The method for producing a polyamide according to any one of the items <1> to <9>, wherein the concentration of the aqueous solution of the phosphorus atom-containing compound (A) is 1% by mass or more, and the solubility in water of the phosphorus atom-containing compound (A) is 90% by mass or less.

<11> The method for producing a polyamide according to any one of the items <1> to <10>, wherein the addition rate of the aqueous solution of the phosphorus atom-containing compound (A) relative to the reactor volume v/V (v: dropping rate [ml/s], V: reactor volume [ml]) is $1.0 \times 10^{-6}$ to $1.0 \times 10^{-3}$ [l/s].

<12> The method for producing a polyamide according to any one of the items <1> to <11>, wherein a polymerization rate controlling agent (B) further is added to the dicarboxylic acid component being in a molten state so as to perform the melt polycondensation in the presence of the phosphorus atom-containing compound (A) and the polymerization rate controlling agent (B).

<13> The method for producing a polyamide according to the item <12>, wherein the polymerization rate controlling agent (B) is at least one selected from the group consisting of an alkali metal hydroxide, an alkaline earth metal hydroxide, an alkali metal acetate and an alkaline earth metal acetate.

<14> The method for producing a polyamide according to the item <12> or <13>, wherein the polymerization rate controlling agent (B) is at least one selected from the group consisting of sodium hydroxide, sodium acetate and potassium acetate.

According to the method of the present invention, there can be produced a xylylene group-containing polyamide having few gels and excellent in mechanical strength and exhibiting few fish eyes in the molded article thereof.

DESCRIPTION OF EMBODIMENTS

The present invention is a method for producing a polyamide, which includes performing melt polycondensation of a diamine component containing xylylenediamine in an amount of 70 mol % or more and a dicarboxylic acid component containing a linear aliphatic dicarboxylic acid having 6 to 18 carbon atoms in an amount of 70 mol % or more in the presence of a phosphorus atom-containing compound (A), wherein the decomposition temperature of the phosphorus atom-containing compound (A) is not lower than the melting point of the polyamide, and wherein an aqueous solution of the phosphorus atom-containing compound (A) and the diamine component are added to the dicarboxylic acid component being in a molten state to perform the melt polycondensation.

(Diamine Component)

The diamine component for use in the production method of the present invention contains, from the viewpoint of the melt moldability, the mechanical characteristics and the gas-barrier performance of the polyamide, xylylenediamine in an amount of 70 mol % or more, preferably 80 to 100 mol %, more preferably 90 to 100 mol %. Xylylenediamine to be used is preferably metaxylylenediamine, paraxylylenediamine or a mixture thereof, and is, from the viewpoint of the heat resistance and the mechanical characteristics of the polyamide, even more preferably paraxylylenediamine or a mixture of paraxylylenediamine and metaxylylenediamine.

The diamine component contains, from the viewpoint of the heat resistance and the mechanical characteristics of the polyamide, paraxylylenediamine in an amount of 50 mol % or more, more preferably 70 mol % or more, even more preferably 80 to 100 mol %, still more preferably 90 to 100 mol %.

The diamine component may contain any other diamine than a xylylenediamine. Examples of the other diamine than xylylenediamine include, though not limited thereto, aliphatic diamines such as tetramethylenediamine, pentamethylenediamine, 2-methyl-pentanediamine, hexamethylenediamine, heptamethylenediamine, octamethylenediamine, nonamethylenediamine, decamethylenediamine, dodecamethylenediamine, 2,2,4-trimethyl-1,6-hexanediamine, 2,4,4-trimethyl-1,6-hexanediamine, etc.; alicyclic diamines such as 1,3-bis(aminomethyl)cyclohexane, 1,4-bis(aminomethyl)

cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, bis(aminomethyl)tricyclodecalin, etc.; aromatic ring-having diamines such as paraphenylenediamine, orthophenylenediamine, metaphenylenediamine, bis(4-aminophenyl) ether, bis(aminomethyl)naphthalene, etc.

One alone or two or more of the above-mentioned diamine components may be used either singly or as combined.

(Dicarboxylic Acid Component)

The dicarboxylic acid component for use in the production method of the present invention contains, from the viewpoint of the thermal stability and the mechanical characteristics of the polyamide, a linear aliphatic dicarboxylic acid having 6 to 18 carbon atoms in an amount of 70 mol % or more, preferably 80 to 100 mol %, more preferably 90 to 100 mol %.

Examples of the linear aliphatic dicarboxylic acid having 6 to 18 carbon atoms include adipic acid, pimelic acid, suberic acid, azelaic acid, sebacic acid, undecanoic diacid, dodecanoic diacid, tetradecanoic diacid, hexadecanoic diacid, octadecanoic diacid, etc. Above all, from the viewpoint of the thermal stability and the mechanical characteristics of the polyamide, at least one selected from the group consisting of adipic acid, azelaic acid, sebacic acid, undecanoic diacid and dodecanoic diacid is preferred, at least one selected from the group consisting of adipic acid and sebacic acid is more preferred, and sebacic acid is even more preferred.

The dicarboxylic acid component may contain any other dicarboxylic acid than a linear aliphatic dicarboxylic acid having 6 to 18 carbon atoms. Examples of the other dicarboxylic acid than a linear aliphatic dicarboxylic acid having 6 to 18 carbon atoms include, though not limited thereto, linear aliphatic dicarboxylic acids having 5 or less carbon atoms or 19 or more carbon atoms, such as oxalic acid, malonic acid, succinic acid, glutaric acid, eicosanoic diacid, etc.; branched aliphatic dicarboxylic acids such as 3,3-diethylsuccinic acid, 2,2-dimethylglutaric acid, 2,4-dimethylglutaric acid, 3,3-dimethylglutaric acid, 2-methyl-adipic acid, 2,2,4-trimethyladipic acid, 2,4,4-trimethyladipic acid, etc.; aliphatic cyclic dicarboxylic acids such as 1,4-cyclohexanedicarboxylic acid, 1,3-cyclopentanedicarboxylic acid, 1,3-cyclohexanedicarboxylic acid, 1,4-cyclohexanedicarboxylic acid, etc.; aromatic dicarboxylic acids such as terephthalic acid, isophthalic acid, 2,6-naphthalenedicarboxylic acid, 2,7-naphthalenedicarboxylic acid, 1,5-naphthalenedicarboxylic acid, 1,4-naphthalenedicarboxylic acid, etc.

One alone or two or more of the above-mentioned dicarboxylic acid components may be used either singly or as combined.

The molar ratio of the diamine component to the dicarboxylic acid component (diamine component/dicarboxylic acid component) is preferably within a range of 0.9 to 1.1, more preferably within a range of 0.93 to 1.07, even more preferably within a range of 0.95 to 1.05, still more preferably within a range of 0.97 to 1.02. When the molar ratio falls within the above range, molecular weight increase may readily go on and therefore the time for increasing the polymerization degree can be shortened and the polyamide can be prevented from being thermally degraded.

(Other Monomer Component)

In addition to the above-mentioned diamine component and dicarboxylic acid component, lactams such as ε-caprolactam, laurolactam, etc.; and aliphatic aminocarboxylic acids such as aminocaproic acid, aminoundecanoic acid, etc. can be used as copolymerization components for constituting the polyamide, within a range not detracting from the effects of the present invention. In the case where these components are added, it is preferable that they are added after the dicarboxylic acid has been put into a reactor.

(Phosphorus Atom-Containing Compound (A))

According to the method of the present invention, a phosphorus atom-containing compound (A) is, in the form of an aqueous solution thereof, added to the dicarboxylic acid being in a molten state, thereby attaining melt polycondensation in the presence of the phosphorus atom-containing compound (A). The presence of the phosphorus atom-containing compound (A) promotes amidation to prevent the polyamide from being colored by oxygen existing in the polycondensation system. The phosphorus atom-containing compound (A) is, in the form of an aqueous solution thereof, added to the dicarboxylic acid being in a molten state, whereby the dispersibility of the phosphorus atom-containing compound (A) in the dicarboxylic acid can be extremely bettered to prevent gel formation.

When water is put into a liquid having a temperature not lower than the boiling point thereof, the volume may rapidly expand and the pressure inside the reactor increases, or the dicarboxylic acid may greatly scatter owing to evaporation of water, and accordingly, from the viewpoint of reaction control, the method of adding an aqueous solution to a dicarboxylic acid being in a molten state is to be evaded normally. As opposed to this, in the present invention, based on the finding of correlationship between the dispersibility of the phosphorus atom-containing compound (A) in the dicarboxylic acid and gel formation, the phosphorus atom-containing compound (A) is, daringly in the form of an aqueous solution thereof, added to a reactor whereby the phosphorus atom-containing compound (A) is uniformly dispersed in the dicarboxylic acid to prevent gel formation.

The method of the present invention is especially suitable to the case where a phosphorus atom-containing compound having poor solubility or having a low dissolution rate in a dicarboxylic acid is used.

When an aqueous solution of the phosphorus atom-containing compound (A) is added, the temperature of the dicarboxylic acid is a fully high temperature relative to the boiling point of water, and therefore as soon as the aqueous solution reaches the molten dicarboxylic acid, water may vaporize. In the case where water vaporizes after the aqueous solution has dispersed in the dicarboxylic acid, the phosphorus atom compound (A) uniformly disperses in the aqueous solution, and even if water vaporizes away before the aqueous solution disperses, it is presumed that the phosphorus atom compound (A) that is precipitated along with vaporization of water to be thereby pulverized into small grains can be uniformly dispersed in the dicarboxylic acid.

In consideration of the above presumed mechanism, it may be considered that, even when the phosphorus atom-containing compound (A) is not in the form of an aqueous solution, the dispersibility of the phosphorus atom-containing compound (A) in the dicarboxylic acid can be improved merely by reducing the particle size of the phosphorus atom-containing compound (A) to enlarge the surface area thereof. In this case, the particle size of the phosphorus atom-containing compound (A) is preferably 5 μm or less.

The decomposition temperature (temperature at which decomposition except dehydration condensation starts) of the phosphorus atom-containing compound (A) for use in the production method of the present invention is not lower than the melting point of the polyamide to be produced, preferably (melting point of polyamide+10° C.) or higher, more preferably (melting point of polyamide+20° C.) or higher. By using the phosphorus atom-containing compound (A) whose decomposition temperature is not lower than the melting point of the polyamide, the amidation can be effectively promoted and the polyamide can be effectively prevented from being colored by oxygen existing in the polycondensation system.

The decomposition temperature of the phosphorus atom-containing compound (A) may be measured through thermogravimetry (TG).

The phosphorus atom-containing compound (A) includes an alkali metal hypophosphite, an alkaline earth metal hypophosphite, an alkali metal phosphite, an alkaline earth metal phosphite, an alkali metal phosphate, an alkaline earth metal phosphate, an alkali metal pyrophosphate, an alkaline earth metal pyrophosphate, an alkali metal metaphosphate and an alkaline earth metal metaphosphate.

Specific examples of the alkali metal hypophosphite include sodium hypophosphite, and potassium hypophosphite. Specific examples of the alkaline earth metal hypophosphite include calcium hypophosphite, and magnesium hypophosphite. Specific examples of the alkali metal phosphite include sodium phosphite, sodium hydrogenphosphite, potassium phosphite, potassium hydrogenphosphite, lithium phosphite, and lithium hydrogenphosphite. Specific examples of the alkaline earth metal phosphite include magnesium phosphite, magnesium hydrogenphosphite, calcium phosphite, and calcium hydrogenphosphite. Specific examples of the alkali metal phosphate include sodium phosphate, disodium hydrogenphosphite, sodium dihydrogenphosphate, potassium phosphate, dipotassium hydrogenphosphate, potassium dihydrogenphosphate, lithium phosphate, dilithium hydrogenphosphate, and lithium dihydrogenphosphate. Specific examples of the alkaline earth metal phosphate include magnesium phosphate, dimagnesium hydrogenphosphate, magnesium dihydrogenphosphate, calcium phosphate, dicalcium hydrogenphosphate, and calcium dihydrogenphosphate. Specific examples of the alkali metal pyrophosphate include sodium pyrophosphate, potassium pyrophosphate, and lithium pyrophosphate. Specific examples of the alkaline earth metal pyrophosphate include magnesium pyrophosphate, and calcium pyrophosphate. Specific examples of the alkali metal metaphosphate include sodium metaphosphate, potassium metaphosphate, and lithium metaphosphate. Specific examples of the alkaline earth metal metaphosphate include magnesium metaphosphate, and calcium metaphosphate.

Among these, in producing a polyamide having a high melting point of 275° C. or higher, from the viewpoint of the decomposition temperature of the phosphorus atom-containing compound (A), the phosphorus atom-containing compound (A) is preferably at least one selected from the group consisting of an alkaline earth metal hypophosphite, an alkali metal phosphite, an alkaline earth metal phosphite, an alkali metal phosphate, an alkaline earth metal phosphate, an alkali metal pyrophosphate, an alkaline earth metal pyrophosphate, an alkali metal metaphosphate and an alkaline earth metal metaphosphate, more preferably at least one selected from the group consisting of calcium hypophosphite (decomposition temperature: 320° C.) and magnesium hypophosphite (decomposition temperature: 341° C.), and even more preferably calcium hypophosphite.

The amount of the phosphorus atom-containing compound (A) to be added to the polycondensation system for the polyamide is preferably 1 to 1,000 ppm, more preferably 15 to 400 ppm, even more preferably 20 to 350 ppm, still more preferably 30 to 300 ppm, as a concentration of a phosphorus atom in the polyamide. When the phosphorus atom concentration in the polyamide is 1 ppm or more, the compound can sufficiently exhibit the effect as an antioxidant and can prevent the polyamide from being colored. On the other hand, when the phosphorus atom concentration in the polyamide is 1,000 ppm or less, generation of foreign substances that may be caused by the phosphorus atom-containing compound (A) can be prevented and a molded article having excellent appearance can be obtained.

The concentration of the aqueous solution of the phosphorus atom-containing compound (A) is, in consideration of any excessive addition of water to the reaction system, preferably 1% by mass or more, more preferably 2% by mass or more, even more preferably 5% by mass or more. However, from the viewpoint of precipitation of the phosphorus atom-containing compound (A), the concentration is preferably 90% by mass or less, more preferably 70% by mass or less, even more preferably 50% by mass or less, relative to the solubility in water of the phosphorus atom-containing compound (A).

The temperature of the aqueous solution of the phosphorus atom-containing compound (A) at the time when the aqueous solution is added is preferably 10 to 80° C., more preferably 15 to 60° C., even more preferably 20 to 35° C.

The addition rate of the aqueous solution of the phosphate atom-containing compound (A) is preferably equivalent to or lower than the generation rate of the condensation water to form in polycondensation of the dicarboxylic acid component and the diamine component, and is preferably a rate of the aqueous solution to run through the addition line such that water does not vaporize out by heat transfer from the reactor while the aqueous solution of the phosphorus atom-containing compound (A) passes through the solution addition line. Accordingly, the addition rate of the aqueous solution of the phosphorus atom-containing compound (A) relative to the reactor volume v/V (v: dropping rate [ml/s], V: reactor volume [ml]) at the time when the aqueous solution of the phosphorus atom-containing compound (A) is added is preferably $1.0 \times 10^{-6}$ to $1.0 \times 10^{-3}$ [1/s], more preferably $5.0 \times 10^{-6}$ to $7.0 \times 10^{-4}$ [1/s], even more preferably $2.0 \times 10^{-5}$ to $5.0 \times 10^{-4}$ [1/s].

The pressure in the reactor at the time when the aqueous solution of the phosphorus atom compound (A) is added is preferably 0 to 1.5 MPa (Abs), more preferably 0.05 to 0.8 MPa (Abs), even more preferably 0.1 to 0.5 MPa (Abs).

The temperature of the dicarboxylic acid being in a molten state at the time when the aqueous solution of the phosphorus atom compound (A) is added is preferably T+10 to T+100 (° C.) where T means the melting point of the dicarboxylic acid, more preferably T+20 to T+90 (° C.), even more preferably T+40 to T+70 (° C.).

The melting point of the dicarboxylic acid is preferably 50 to 300° C., more preferably 80 to 280° C., even more preferably 100 to 260° C. The melting point of the dicarboxylic acid may be measured with a differential scanning calorimeter (DSC). In the case where two or more kinds or dicarboxylic acids are used as combined, the highest melting point thereof is the melting point of the dicarboxylic acid.

The aqueous solution of the phosphorus atom-containing compound (A) may be added simultaneously with the diamine component relative to the dicarboxylic acid component being in a molten state, but from the viewpoint of uniformly dispersing the phosphorus atom-containing compound (A) in the dicarboxylic acid component, it is preferable that the aqueous solution of the phosphorus atom-containing compound (A) is first added to the dicarboxylic acid component being in a molten state so that the phosphorus atom-containing compound (A) is dispersed in the dicarboxylic acid component, and thereafter the diamine component is added thereto.

As the method of adding the aqueous solution of the phosphorus atom-containing compound (A) to the dicarboxylic acid being in a molten state, there is mentioned a method of continuously adding the solution, or a method of adding the solution in 2 to 10 additions. From the viewpoint of preventing any rapid fluctuation in pressure in the apparatus, a method of continuously adding the solution is preferred.

(Polymerization Rate Controlling Agent (B))

In the method of the present invention, for preventing the polyamide during polycondensation from being colored, the phosphorus atom-containing compound (A) must be added, which, however, may cause gelation of the polyamide. Accordingly, from the viewpoint of preventing gelation of the polyamide, it is preferable that a polymerization rate controlling agent (B) is further added to the dicarboxylic acid being in a molten state and the melt polycondensation is performed in the presence of the phosphorus atom-containing compound (A) and the polymerization rate controlling agent (B).

The polymerization rate controlling agent (B) may be at least one selected from the group consisting of an alkali metal hydroxide, an alkaline earth metal hydroxide, an alkali metal acetate and an alkaline earth metal acetate, and an alkali metal hydroxide, and an alkali metal acetate is preferred.

Specific examples of the alkali metal hydroxide include lithium hydroxide, sodium hydroxide, potassium hydroxide, rubidium hydroxide, and cesium hydroxide. Specific examples of the alkaline earth metal hydroxide include magnesium hydroxide, calcium hydroxide, strontium hydroxide, and barium hydroxide. Specific examples of the alkali metal acetate include lithium acetate, sodium acetate, potassium acetate, rubidium acetate, and cesium acetate. Specific examples of the alkaline earth metal acetates include magnesium acetate, calcium acetate, strontium acetate, and barium acetate.

Among these, as the polymerization rate controlling agent (B), at least one selected from the group consisting of sodium hydroxide, potassium hydroxide, magnesium hydroxide, calcium hydroxide, sodium acetate and potassium acetate is preferred, at least one selected from the group consisting of sodium hydroxide, sodium acetate and potassium acetate is more preferred, and sodium acetate is even more preferred.

In the case where the polymerization rate controlling agent (B) is added to the polycondensation system, from the viewpoint of balance between acceleration and suppression of amidation, the molar ratio of the phosphorus atom of the phosphorus atom-containing compound (A) to the polymerization rate controlling agent (B) [(A)/(B)] (=[molar number of phosphorus atom of the phosphorus atom-containing compound (A)]/[molar number of polymerization rate controlling agent (B)]) is preferably 0.10 to 0.95, more preferably 0.30 to 0.90, even more preferably 0.40 to 0.80.

The polymerization rate controlling agent (B) may be added to the polycondensation system separately from the phosphorus atom compound (A), or may be added to the polycondensation system as an aqueous solution of the phosphorus atom compound (A) and the polymerization rate controlling agent (B).

(Molecular Weight Controlling Agent)

In the method of the present invention, as a molecular weight controlling agent, a small amount of a monofunctional compound having reactivity with the terminal amino group or the terminal carboxyl group of the polyamide may be added. Examples of the monofunctional compound include, though not limited thereto, aliphatic monocarboxylic acids such as acetic acid, propionic acid, butyric acid, valeric acid, caproic acid, caprylic acid, lauric acid, tridecylic acid, myristic acid, palmitic acid, stearic acid, pivalic acid, etc.; aromatic monocarboxylic acids such as benzoic acid, toluic acid, naphthalenecarboxylic acid, etc.; aliphatic monoamines such as butylamine, amylamine, isoamylamine, hexylamine, heptylamine, octylamine, etc.; aromatic aliphatic monoamines such benzylamine, methylbenzylamine, etc.; and mixtures thereof.

In the case where a molecular weight controlling agent is used in the polycondensation system, a preferred amount to be used thereof may vary depending on the reactivity and the boiling pint of the molecular weight controlling agent and on the reaction conditions, etc., but is generally 0.1 to 10% by mass or so relative to the total of the diamine component and the dicarboxylic acid component which are starting materials.

(Polycondensation Method for Polyamide)

The polycondensation method for the polyamide includes a reaction extrusion method, a pressurized salt method, a normal-pressure instillation method, a pressurized instillation method, etc. Preferably, the present invention is applied to a normal-pressure instillation method or a pressurized instillation method where the diamine component is continuously dropwise added to the dicarboxylic acid component being in a molten state in the reactor to perform polycondensation, and is applied more preferably to a pressurized instillation method.

In a normal-pressure instillation method, an aqueous solution of the phosphorus atom-containing compound (A) and the diamine component are continuously dropwise added to the dicarboxylic acid component being in a molten state in the reactor under a normal pressure to perform polycondensation while condensation water is removed. The polycondensation is performed with heating the reaction system such that the reaction temperature is not lower than the melting point of the polyamide to be formed.

In a pressurized instillation method, an aqueous solution of the phosphorus atom-containing compound (A) and the diamine component are continuously dropwise added to the dicarboxylic acid component being in a molten state while the reactor is pressurized to be under a pressure of preferably 0.4 to 0.5 MPa (Abs) or so to perform polycondensation while condensation water is removed. At this time, the polycondensation is performed with heating the reaction system so that the reaction temperature is not lower than the melting point of the polyamide to be formed. After the system has reached a predetermined molar ratio, dropwise addition of the diamine component is ended, then while the reactor is gradually restored to be at normal pressure, the system is heated up to the melting point of the polyamide+ 10° C. or so, kept as such, then gradually depressurized down to be at 0.08 MPa (Abs), and further kept at the temperature to continue the polycondensation. After the system has reached a predetermined stirring torque, the reactor is pressurized with nitrogen to be at 0.4 MPa (Abs) or so, and the polyamide is collected.

The temperature of the reaction mixture just after addition of the diamine component is preferably Tm (° C.) or higher and lower than Tm+35 (° C.) where Tm is the melting point of the polyamide to be produced, more preferably Tm (° C.) or higher and lower than Tm+15 (° C.), even more preferably Tm (° C.) or higher and lower than Tm+5 (° C.).

The addition time for the diamine component is not specifically limited, but when the addition rate is too high, the temperature rising rate of the reaction system may be low owing to insufficiency of heating power. Depending on the capacity of the reaction apparatus and on the heating power of the heater used, etc., the addition time for the diamine component is preferably 30 minutes to 5 hours, more preferably 30 minutes to 4 hours.

The condensation water generated with proceeding of reaction is evaporated out of the reaction system via a partial condenser and a total condenser (cooler). Preferably, the diamine component that evaporates out of the reaction system as a vapor along with the condensation water, the dicarboxylic acid to evaporate away as a vapor, and the like are separated from water vapor in the partial condenser, and are again returned back to the reactor.

It is preferable that, immediately after addition of the diamine component, the temperature of the reaction mixture is kept constant and the stirring is continued for 10 to 30 minutes or so.

Subsequently, preferably, the system is depressurized down to 40 to 90 kPa (Abs) at a rate of 0.005 to 0.03 MPa/min, and the stirring is continued for 5 to 40 minutes or so to obtain a polyamide.

The resultant polyamide may be once taken out, pelletized, dried and used. For further increasing the polymerization degree, the pelletized polyamide may be processed for solid-phase polymerization.

The heating apparatus that is used for drying and solid-phase polymerization is preferably a continuous-type heating drying apparatus, a rotary drum-type heating apparatus such as a so-called tumble drier, conical drier, rotary drier or the like, or a conical heating apparatus equipped with a rotary vane inside it, such as a so-called Nauta mixer, but not limited thereto, any known method and apparatus can be used.

Especially, in the case of performing solid-phase polymerization for polyamide, a rotary drum-type heating apparatus among the above-mentioned apparatuses is preferred since the reactor therein can be airtightly sealed up and since the polycondensation can readily be promoted in the absence of oxygen that may cause coloration.

<Polyamide>

The polyamide to be obtained according to the method of the present invention contains few gels and is excellent in mechanical strength, and the molded article thereof contains few fish eyes.

(Melting Point)

The melting point of the polyamide is preferably 210° C. or higher, more preferably 250° C. or higher, even more preferably 260° C. or higher, still more preferably 275° C. or higher. In the present invention, the melting point of the polyamide is a value measured according to JIS K7121, and JIS K7122.

Among xylylene group-containing polyamides, the polyamide using paraxylylenediamine as the starting material has a relatively high melting point. In producing such a polyamide, it is necessary that the phosphorus atom-containing compound to be selected for use for the production has a decomposition temperature higher than the melting point of the polyamide. However, the present inventors' investigation have revealed that the solubility (dispersibility) in a dicarboxylic acid of the phosphorus atom-containing compound having such a high decomposition temperature is insufficient, and when the resultant polyamide is molded into a molded article, the molded article tends to have many gels caused by the phosphorus atom-containing compound. According to the present invention, even in the case where a phosphorus atom-containing compound that is problematic in point of the dispersibility thereof in an ordinary addition method is used, the compound can be uniformly dispersed in the dicarboxylic acid component being in a molten state since the phosphorus atom-containing compound is added thereto in the form of an aqueous solution thereof, and, as a result, generation of gels and foreign substances in the polymer can be reduced. Accordingly, the method of the present invention is effective for producing a polyamide having a high melting point.

The melting point of the polyamide may be determined depending on the kinds of the diamine component and the dicarboxylic acid component which are starting materials. For example, the melting point of polyparaxylylenesebacamide (PXD10) obtained from paraxylylenediamine and sebacic acid is about 284° C., the melting point of polymetaxylyleneadipamide (MXD6) obtained from metaxylylenediamine and adipic acid is about 238° C., the melting point of polymetaxylyleneadipamide/polyparaxylyleneadipamide copolymer obtained from metaxylylenediamine and paraxylylenediamine (molar ratio=70/30) and adipic acid is about 258° C., the melting point of polymetaxylyleneadipamide/polyparaxylyleneadipamide copolymer obtained from metaxylylenediamine and paraxylylenediamine (molar ratio=50/50) and adipic acid is about 278° C., and the melting point of polymetaxylylenesebacamide/polyparaxylylenesebacamide copolymer obtained from metaxylylenediamine and paraxylylenediamine (molar ratio=20/80) and sebacic acid is about 263° C. Accordingly, by previously preparing a calibration curve of the melting point of polyamide based on the diamine component and the dicarboxylic acid component which are starting materials, the meting point of the polyamide to be produced can be predicted.

(Yellow Index (YI))

Regarding the polyamide to be obtained according to the method of the present invention, the YI value in a color difference test thereof according to JIS K7373 is preferably 10 or less, more preferably 6 or less, even more preferably 5 or less. When the YI value of the polyamide is 10 or less, the molded article to be produced through post-processing thereof can be prevented from yellowing, and the commercial value thereof is therefore high.

(Relative Viscosity)

There are some indices for the polymerization degree of polyamide, but a relative viscosity is generally employed. The relative viscosity of the polyamide to be obtained according to the method of the present invention is, from the viewpoint of the appearance and the molding processability of the molded article thereof, preferably 1.8 to 4.2, more preferably 1.9 to 3.5, even more preferably 2.0 to 3.0.

The relative viscosity as referred to herein is as follows. 0.2 g of the polyamide is dissolved in 20 mL of 96 mass % sulfuric acid and the falling time thereof (t) is measured with a Canon-Fenske viscometer at 25° C. Similarly, the falling time ($t_0$) of 96 mass % sulfuric acid itself is measured. The ratio of the two, which is expressed by the following formula (1), is the relative viscosity.

$$\text{Relative viscosity} = t/t_0 \qquad (1)$$

(Number-Average Molecular Weight, Molecular Weight Distribution)

The number-average molecular weight (Mn), as measured through gel permeation chromatography (GPC), of the polyamide to be obtained according to the method of the present invention is preferably 10,000 to 50,000, more preferably 12,000 to 40,000, even more preferably 14,000 to 30,000. When Mn is specified to fall within the above range, the polyamide may have a suitable melt viscosity with which the mechanical strength of the molded article formed by the polyamide is stable and the processability in molding the polyamide is bettered.

The molecular weight distribution (weight-average molecular weight/number-average molecular weight=Mw/Mn) of the polyamide of the present invention is preferably 1.5 to 5.0, more preferably 1.5 to 3.5. When the molecular weight distribution is specified to fall within the range, the flowability and the stability of the melt viscosity in melting can be enhanced, and the processability in melt-kneading and melt-molding can be bettered. In addition, the toughness is good, and various properties such as water absorption resistance, chemical resistance and thermal aging resistance can also be bettered.

<Polyamide Resin Composition>

By adding any other resin and various additives to the polyamide obtained according to the method of the present invention, a polyamide resin composition containing the polyamide of the present invention may be provided.

Examples of the other resin than the polyamide of the present invention that may be contained in the polyamide resin composition of the present invention include nylon 6, nylon 66, polyester, polyolefin, etc.

The polyamide resin composition of the present invention may contain, as incorporated therein, various additives generally used in polymer materials, within a range not detracting from the advantageous effects of the present invention.

Examples of the additives include inorganic fillers such as glass fibers, carbon fibers, etc.; tabular inorganic fillers such as glass flakes, talc, kaolin, mica, montmorillonite, organic clay, etc.; impact resistance improvers such as various elastomers, etc.; crystal nucleating agents; lubricants such as fatty acid amides, fatty acid metal salts, fatty acid amide compounds, etc.; antioxidants such as copper compounds, organic or inorganic halide compounds, hindered phenols, hindered amines, hydrazines, sulfur-containing compounds, etc.; heat stabilizers, coloration inhibitors; UV absorbents such as benzotriazoles, etc.; mold release agents; plasticizers; colorants; flame retardants; cobalt metal-containing compound that are compounds capable of imparting oxygen trapping capability, etc.

The method of incorporating other resins and various additives to the polyamide of the present invention is not specifically limited, for which any desired method may be employed. For example, predetermined amount of other resins and various additives are incorporated in the polyamide, and then melt-kneaded or dry-blended to obtain the polyamide resin composition of the present invention.

The melt-kneading method may be any conventional method. For example, there is mentioned a method of melt-kneading the components under heat, using a single-screw or twin-screw extruder, a kneader, a mixing roll, a Banbury mixer, a vented extruder or any other apparatus similar to these. All the materials may be put into the apparatus all at a time from the base of the extruder and may be melt-kneaded therein, or a different kneading method may be employed where resin components are first put into the apparatus and, while these are melted, a fibrous filler is fed thereto from the side to be kneaded together with the molten resin components. In addition, a method is also employable where different types of compounds are pelletized, and the resulting pellets may be blended, or where a part of a powdery component or a liquid component is separately blended.

<Molded Article>

The polyamide and the polyamide resin composition of the present invention may be molded into a molded article having a desired shape, according to a known molding method such as injection molding, blow molding, extrusion molding, compression molding, stretching, vacuum forming or the like. Not only molded articles as engineering plastics but also any other shapes of films, sheets, hollow containers, fibers, tubes and the like may be formed by molding, and these are favorably used for industrial materials, engineering materials, domestic articles, etc.

In particular, when the polyamide of the present invention is one produced using, as a starting material, paraxylylenediamine, molded articles containing the polyamide or the polyamide resin composition can be used in various applications for electric/electronic parts, sliding parts, blow-molded articles, automobile parts, etc.

Specific examples of electric/electronic parts include electric/electronic parts to be mounted on printed boards, such as connectors, switches, IC or LED housings, sockets, relays, resistors, condensers, capacitors, coil bobbins, etc. Specific examples of sliding parts include various sliding members such as bearings, gears, bushes, spacers, rollers, cams, etc. Specific examples of automobile parts include engine mounts, engine covers, torque control levers, wind regulators, headlamp reflectors, door mirror stays, etc.

EXAMPLES

The present invention is described in further detail with reference to the following Examples and Comparative Examples, but the present invention is not limited to these Examples. In these Examples, various measurements were performed according to the following methods.

(1) Relative Viscosity of Polyamide 0.2 g of the polyamide was weighed accurately and dissolved in 20 mL of 96% sulfuric acid with stirring at 20 to 30° C. After the polyamide was dissolved completely, 5 mL of the solution was immediately taken into a Canon-Fenske viscometer and allowed to stand in a thermostat bath at 25° C. for 10 minutes, and then a falling time (t) was measured. In addition, a falling time ($t_0$) of the 96% sulfuric acid itself was measured in the same way. A relative viscosity was calculated from t and to according to the following equation.

$$\text{Relative viscosity} = t/t_0$$

(2) Number-Average Molecular Weight and Molecular Weight Distribution of Polyamide The number-average molecular weight (Mn) and the molecular weight distribution (Mw/Mn) of the polyamide were determined through gel permeation chromatography (GPC). Specifically, "HLC-8320GPC" manufactured by Tosoh Corporation was used as the apparatus, and two columns of "TSK Gel Super HM-H" manufactured by Tosoh Corporation were used. As an eluent, hexafluoroisopropanol (HFIP) with 10 mmol/L of sodium trifluoroacetate was used. Under the conditions of a polyamide concentration of 0.02% by mass, a column temperature of 40° C. and a flow rate of 0.3 ml/min, and using a refractive index detector (RI), the molecular weight distribution was determined. The molecular weight of the polyamide was obtained as a standard polymethyl methacrylate-equivalent value thereof.

(3) YI of Polyamide

YI of the polyamide was measured according to a reflection method in conformity with JIS K7373, using a color difference meter (trade name: "ZE-2000", manufactured by Nippon Denshoku Industries Co., Ltd.).

(4) Phosphorus Atom Concentration in Polyamide

The phosphorus atom concentration in the polyamide was measured using a wavelength-dispersive fluorescent X ray analyzer (trade name: "ZSX Primis II", manufactured by Rigaku Corporation).

(5) Melting Point of Polyamide

The melting point of the polyamide was measured according to JIS K7121, and JIS K7122.

(6) Number of Fish Eyes in Film

In the process of producing films in Examples and Comparative Examples, the produced film was led to pass between a camera and a light source of a fish eyes detector, and while wound around a winder and after 1 hour from the start of extrusion, the number of fish eyes having a diameter of 20 μm or more existing in a part of the film having a width of 10 cm and a length of 50 m was counted, and the number of fish eyes per one $m^2$ of the film was thereby calculated. It is preferable that the number of fish eyes is smaller.

(7) Measurement of Calcium Concentration in Fish Eyes

Fish eyes having a diameter of 20 μm or more were cut out of the film produced in Examples and Comparative Examples, plated with Pt having a thickness of 3 nm in a mode of vapor deposition, and the calcium ion concentration in the fish eyes was measured using SEM-EDX (SEM: trade name "S-3400" manufactured by Hitachi Ltd., EDX: trade name "EMAXE volution EX", manufactured by Horiba Ltd.). The detection sensitivity of SEM-EDX is 0.1% (relative concentration: relative value to other elements).

In production of the polyamide, potassium hypophosphite is added as the phosphorus atom-containing compound (A), and therefore, when a calcium ion is detected, it is presumed that the fish eyes analyzed by the above derive from the phosphorus atom-containing compound (A).

(8) Measurement of Impact-Resistant Strength

Pieces of the molded article in Examples and Comparative Examples were analyzed according to JIS K7111 to measure the impact-resistant strength thereof.

Example 1

(1) Production of Polyamide

A batch-type stainless reaction apparatus having a capacity of 50 liters, in which the entire surface of the reactor was covered with an oil-running jacket, and which was equipped with a partial condenser through which a temperature-controlled oil was to pass, a total condenser and a nitrogen gas inlet, was used.

Into the reactor of the above-mentioned apparatus, 15.000 kg of sebacic acid (purity 99.70% by mass, melting point: 132° C.) as a dicarboxylic acid component was fed, then fully purged with nitrogen, pressurized up to 0.4 MPa (Abs), and heated up to 190° C. with stirring to obtain a molten sebacic acid. The melting point of the sebacic acid was measured at a heating rate of 10° C./min, using a differential scanning calorimeter (trade name: "DSC-60", manufactured by Shimadzu Corporation).

Next, 3.06 g of calcium hypophosphite (decomposition temperature: 320° C., solubility in 100 g of water at 25° C.: 14 g) and 3.30 g of sodium acetate were dissolved in 43.7 ml of water to prepare an aqueous solution having a solid concentration of 12.7% by mass. The aqueous solution at 25° C. was put in a small-size pressure-tight container and sealed up, and the pressure-tight container was connected to the reaction apparatus. With that, the aqueous solution in the pressure-tight container was continuously added to the molten sebacic acid in the reactor at an addition rate of 1.5 ml/s.

Then, after the system reached 200° C., 9.985 kg (purity 99.85% by mass) of paraxylylenediamine as a diamine component was dropwise added to the reactor over 180 minutes. During this addition, the system was heated in such that the temperature at the end of the addition became 300° C., the reaction pressure was kept constant at 0.4 MPa (Abs), the vapor temperature on the side of the outlet port of the partial condenser was controlled to be 144 to 147° C., and the vaporized vapor was condensed through the total condenser and discharged out of the system.

After the addition of the diamine, the system was kept at 300° C. with stirring at 0.4 MPa (Abs) for 15 minutes, then depressurized down to 80 kPa (Abs) at a rate of 0.01 MPa/min over 30 minutes, stirred for 10 minutes, and thereafter the reaction apparatus was pressurized with nitrogen and the product was taken out as strands, and pelletized with a pelletizer to obtain a polyamide (1).

The relative viscosity of the polyamide (1) was 2.2, the number-average molecular weight Mn was 14,900, Mw/Mn was 3.3, the YI value was 1, the phosphorus atom concentration was 30 ppm, and the melting point was 284° C.

In the following evaluation, pellets prepared by drying the polyamide (1) under a reduced pressure (5 mmHg or less) at 150° C. for 8 hours were used.

(2) Production of Film

A film extruder equipped with a single-screw extruder having a diameter of 25 mm (Model "PTM25", manufactured by Research Laboratory of Plastics Technology Co., Ltd.), a head and a T-die, a chill roll, a fish eyes detector (Model "GX70W", manufactured by Mamiya-OP Co., Ltd.), and a take-up unit equipped with a winder were used.

At a cylinder temperature of 330° C. and a die temperature of 320° C., the product was extruded out in a film shape through the extruder at a discharge rate of 3 kg/hr, and while the take-up rate was controlled, a film having a width of 15 cm and a thickness of 50 μm was formed, and the number of fish eyes therein was counted with the detector.

(3) Production of Molded Piece for Charpy Impact Test

The dried polyamide (1) was put into an injection-molding machine (trade name "SE130DU-HP" manufactured by Sumitomo Heavy Industries, Ltd.), melted therein at a temperature higher than the melting point of the polyamide (1) by 20° C., and molded under the condition of an injection pressure of 600 kgf/$cm^2$, an injection time of 10 seconds and a mold temperature of 120° C. to obtain a molded piece of 80 mm×10 mm×4 mm.

Comparative Example 1

According to the same method as in Example 1 except that 3.06 g of calcium hypophosphite having a mean particle size of about 100 µm and 3.30 g of sodium acetate having a mean particle size of about 100 µm were, as solid powder per se, added to the molten sebacic acid in the reactor, a polyamide (2) was produced.

The relative viscosity of the polyamide (2) was 2.2, the number-average molecular weight Mn was 15,300, the Mw/Mn was 3.3, the YI value was 5, the phosphorus atom concentration was 30 ppm, and the melting point was 284° C.

In the same manner as in Example 1 except that the polyamide (1) was changed to the polyamide (2), a film and a test piece were produced.

Example 2

According to the same method as in Example 1 except that 4.76 g of magnesium hypophosphite hexahydrate (decomposition temperature: 341° C., solubility in 100 g of water at 25° C.: 23.0 g) was used in place of calcium hypophosphite, a polyamide (3) was produced.

The relative viscosity of the polyamide (3) was 2.2, the number-average molecular weight Mn was 14,500, Mw/Mn was 3.4, the YI value was 3, the phosphorus atom concentration was 30 ppm, and the melting point was 284° C.

In the same manner as in Example 1 except that the polyamide (1) was changed to the polyamide (3), a film and a test piece were produced, and evaluated. The number of fish eyes in the resultant film was 5,800/m$^2$, and the impact-resistant strength of the molded article was not lower than 200 kJ/m$^2$ (not lower than the measuring upper limit of the measurement apparatus).

Comparative Example 2

According to the same method as in Example 2 except that 4.76 g of magnesium hypophosphite hexahydrate having a mean particle size of about 300 µm and 3.30 g of sodium acetate having a mean particle size of about 100 µm were added as solid powder per se, a polyamide (4) was produced.

The relative viscosity of the polyamide (4) was 2.3, the number-average molecular weight Mn was 15,100, Mw/Mn was 3.3, the YI value was 3, the phosphorus atom concentration was 30 ppm, and the melting point was 284° C.

In the same manner as in Example 1 except that the polyamide (1) was changed to the polyamide (4), a film and a test piece were produced and evaluated. The number of fish eyes in the resultant film was 14,000/m$^2$, and the impact-resistant strength of the molded article was 92 kJ/m$^2$.

Example 3

According to the same method as in Example 1 except that 9.985 kg of metaxylylenediamine/paraxylylenediamine (20/80, molar ratio) (purity 99.85% by mass) was used in place of paraxylylenediamine as the diamine component and that the highest temperature of the reaction liquid during polymerization was 275° C., a polyamide (5) was produced.

The relative viscosity of the polyamide (5) was 2.1, the number-average molecular weight Mn was 14,000, Mw/Mn was 3.3, the YI value was −1, the phosphorus atom concentration was 30 ppm, and the melting point was 263° C.

In the same manner as in Example 1 except that the polyamide (1) was changed to the polyamide (5), a film and a test piece were produced and evaluated. The number of fish eyes in the resultant film was 4,700/m$^2$, and the impact-resistant strength of the molded article was not lower than 200 kJ/m$^2$ (not lower than the measuring upper limit of the measurement apparatus).

Comparative Example 3

According to the same method as in Example 3 except that 3.06 g of calcium hypophosphite having a mean particle size of about 100 µm and 3.30 g of sodium acetate having a mean particle size of about 100 µm were added as solid powder per se, a polyamide (6) was produced.

The relative viscosity of the polyamide (6) was 2.2, the number-average molecular weight Mn was 14,600, Mw/Mn was 3.3, the YI value was 0, the phosphorus atom concentration was 30 ppm, and the melting point was 263° C.

In the same manner as in Example 1 except that the polyamide (1) was changed to the polyamide (6), a film and a test piece were produced and evaluated. The number of fish eyes in the resultant film was 16,000/m$^2$, and the impact-resistant strength of the molded article was 86 kJ/m$^2$.

Example 4

According to the same method as in Example 1, except that 10.822 kg of adipic acid (purity 99.85% by mass) was used in place of sebacic acid as the dicarboxylic acid component, that 10.056 kg of metaxylylenediamine/paraxylylenediamine (50/50, molar ratio) was used in place of paraxylylenediamine as the diamine component and that the highest temperature of the reaction liquid during polymerization was 285° C., a polyamide (7) was produced.

The relative viscosity of the polyamide (7) was 2.2, the number-average molecular weight Mn was 14,200, Mw/Mn was 3.2, the YI value was 15, the phosphorus atom concentration was 37 ppm, and the melting point was 275° C.

In the same manner as in Example 1 except that the polyamide (1) was changed to the polyamide (7), a film and a test piece were produced and evaluated. The number of fish eyes in the resultant film was 6,200/m$^2$, and the impact-resistant strength of the molded article was 72 kJ/m$^2$.

Comparative Example 4

According to the same method as in Example 4 except that 3.06 g of calcium hypophosphite having a mean particle size of about 100 µm and 3.30 g of sodium acetate having a mean particle size of about 100 µm were added as solid powder per se, a polyamide (8) was produced.

The relative viscosity of the polyamide (8) was 2.2, the number-average molecular weight Mn was 14,400, Mw/Mn was 3.2, the YI value was 15, the phosphorus atom concentration was 30 ppm, and the melting point was 275° C.

In the same manner as in Example 1 except that the polyamide (1) was changed to the polyamide (8), a film and a test piece were produced and evaluated. The number of fish eyes in the resultant film was 17,000/m$^2$, and the impact-resistant strength of the molded article was 44 kJ/m$^2$.

TABLE 1

| | Kind of Polyamide | Dicarboxylic Acid Component | Diamine Component | Phosphorus Atom-Containing Compound Kind | State during addition | Number of Fish Eyes (number/m$^2$) | $Ca^{2+}$ Concentration in Fish Eyes (mass %) | Impact-Resistant Strength (kJ/m$^2$) |
|---|---|---|---|---|---|---|---|---|
| Example 1 | Polyamide (1) | sebacic acid | PXDA | $Ca(H_2PO_2)_2$ | aqueous solution | 4800 | 0 (*1) | 200 or more (*2) |
| Comparative Example 1 | Polyamide (2) | | | | solid powder | 12000 | 2 | 105 |
| Example 2 | Polyamide (3) | sebacic acid | PXDA | $Mg(H_2PO_2)_2 \cdot 6H_2O$ | aqueous solution | 5800 | — | 200 or more (*2) |
| Comparative Example 2 | Polyamide (4) | | | | solid powder | 14000 | — | 92 |
| Example 3 | Polyamide (5) | sebacic acid | MXDA 20 mol % | $Ca(H_2PO_2)_2$ | aqueous solution | 4700 | not measured | 200 or more (*2) |
| Comparative Example 3 | Polyamide (6) | | PXDA 80 mol % | | solid powder | 16000 | not measured | 86 |
| Example 4 | Polyamide (7) | adipic acid | MXDA 50 mol % | $Ca(H_2PO_2)_2$ | aqueous solution | 6200 | not measured | 72 |
| Comparative Example 4 | Polyamide (8) | | PXDA 50 mol % | | solid powder | 17000 | not measured | 44 |

PXDA: paraxylylenediamine, MXDA: metaxylylenediamine
(*1) Not higher than the measuring limit of the measurement apparatus.
(*2) Not lower than the measuring upper limit of the measurement apparatus.

From Table 1, it is known that, in the film of the polyamide (1) of Example 1, the number of fish eyes is smaller than that in the film of the polyamide (2) of Comparative Example 1, and the molded article (test piece) using the polyamide (1) of Example 1 has a high impact-resistant strength of not lower than 200 kJ/m$^2$ and is excellent in mechanical characteristics, as compared with the molded article of Comparative Example 1.

Since calcium ions were detected in the fish eyes generated in the film of Comparative Example 1, it is considered that the fish eyes would be generated owing to gel formation in the polyamide (2) as the calcium hypophosphite added in the process of producing the polyamide (2) could not be sufficiently dispersed in sebacic acid. As opposed to this, in the polyamide (1) of Example 1, it is considered that calcium hypophosphite could be uniformly dispersed in sebacic acid and a gel based on localization of calcium hypophosphite would not be formed.

Similarly, comparing Example 2 with Comparative Example 2, Example 3 with Comparative Example 3, and Example 4 with Comparative Example 4, it can be seen that, in the films of Examples 2 to 4, the number of fish eyes is smaller than that in the films of Comparative Examples 2 to 4, and the molded articles of Examples 2 to 4 are excellent in mechanical characteristics as compared with the molded articles of Comparative Examples 2 to 4.

Accordingly, it can be seen that, by adding a phosphorus atom-containing compound in the form of an aqueous solution thereof to a dicarboxylic acid being in a molten state, the dispersibility of the phosphorus atom-containing compound in the dicarboxylic acid can be extremely bettered to prevent gel formation.

According to the method of the present invention, a xylylene group-containing polyamide having few gels and excellent in mechanical characteristics and exhibiting few fish eyes in the molded article thereof can be produced. Consequently, the polyamide produced according to the method of the present invention is favorably used as a molding material for industrial and engineering articles such as automobile parts, electric/electronic instrument parts, machine parts and the like and for domestic articles.

The invention claimed is:

1. A method for producing a polyamide, comprising performing melt polycondensation of a diamine component comprising xylylenediamine in an amount of 70 mol % or more and a dicarboxylic acid component comprising a linear aliphatic dicarboxylic acid having 6 to 18 carbon atoms in an amount of 70 mol % or more in the presence of a phosphorus atom-containing compound (A),
wherein:
the decomposition temperature of the phosphorus atom-containing compound (A) is not lower than the melting point of the polyamide,
an aqueous solution of the phosphorus atom-containing compound (A) and the diamine component are added to the dicarboxylic acid component being in a molten state to perform the melt polycondensation; and
the addition rate of the aqueous solution of the phosphorus atom-containing compound (A) relative to the reactor volume v/V (v: dropping rate [ml/s], V: reactor volume [ml]) is $1.0 \times 10^{-6}$ to $5.0 \times 10^{-4}$ [1/s].

2. The method for producing a polyamide according to claim 1, wherein the aqueous solution of the phosphorus atom-containing compound (A) is added to the dicarboxylic acid component being in a molten state so as to disperse the phosphorus atom-containing compound (A) in the dicarboxylic acid component, and then the diamine component is added thereto.

3. The method for producing a polyamide according to claim 1, wherein the diamine component comprises metaxylylenediamine, paraxylylenediamine or a mixture thereof.

4. The method for producing a polyamide according to claim 1, wherein the diamine component comprises paraxylylenediamine in an amount of 70 mol % or more.

5. The method for producing a polyamide according to claim 1, wherein the linear aliphatic dicarboxylic acid is at least one selected from the group consisting of adipic acid, azelaic acid, sebacic acid, undecanoic diacid and dodecanoic diacid.

6. The method for producing a polyamide according to claim 1, wherein the melting point of the polyamide is 260° C. or higher.

7. The method for producing a polyamide according to claim 1, wherein the melting point of the polyamide is 275° C. or higher.

8. The method for producing a polyamide according to claim 1, wherein the phosphorus atom-containing compound (A) is at least one selected from the group consisting of an alkaline earth metal hypophosphite, an alkali metal phosphite, an alkaline earth metal phosphite, an alkali metal phosphate, an alkaline earth metal phosphate, an alkali metal pyrophosphate, an alkaline earth metal pyrophosphate, an alkali metal metaphosphate and an alkaline earth metal metaphosphate.

9. The method for producing a polyamide according to claim 1, wherein the phosphorus atom-containing compound (A) is at least one selected from the group consisting of calcium hypophosphite and magnesium hypophosphite.

10. The method for producing a polyamide according to claim 1, wherein the concentration of the aqueous solution of the phosphorus atom-containing compound (A) is 1% by mass or more, and the solubility in water of the phosphorus atom-containing compound (A) is 90% by mass or less.

11. The method for producing a polyamide according to claim 1, wherein a polymerization rate controlling agent (B) further is added to the dicarboxylic acid component being in a molten state so as to perform the melt polycondensation in the presence of the phosphorus atom-containing compound (A) and the polymerization rate controlling agent (B).

12. The method for producing a polyamide according to claim 11, wherein the polymerization rate controlling agent (B) is at least one selected from the group consisting of an alkali metal hydroxide, an alkaline earth metal hydroxide, an alkali metal acetate and an alkaline earth metal acetate.

13. The method for producing a polyamide according to claim 11, wherein the polymerization rate controlling agent (B) is at least one selected from the group consisting of sodium hydroxide, sodium acetate and potassium acetate.

* * * * *